(12) United States Patent
Siboda

(10) Patent No.: US 9,110,968 B2
(45) Date of Patent: Aug. 18, 2015

(54) REMOVAL OF INVISIBLE DATA PACKAGES IN DATA WAREHOUSES

(75) Inventor: Eric Mathew Siboda, Saint Charles, MO (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 446 days.

(21) Appl. No.: 12/760,189

(22) Filed: Apr. 14, 2010

(65) Prior Publication Data

US 2011/0258166 A1    Oct. 20, 2011

(51) Int. Cl.
*G06F 17/30*    (2006.01)
*G06F 11/14*    (2006.01)

(52) U.S. Cl.
CPC ......... *G06F 17/30592* (2013.01); *G06F 11/14* (2013.01)

(58) Field of Classification Search
CPC ............... G06F 17/30371; G06F 17/30303; G06F 17/30008; G06F 11/1471
See application file for complete search history.

(56) References Cited

U.S. PATENT DOCUMENTS

| | | | |
|---|---|---|---|
| 5,450,593 A * | 9/1995 | Howell et al. | 726/21 |
| 7,254,640 B2 | 8/2007 | Alexander | |
| 7,523,124 B2 | 4/2009 | Lavdas | |
| 2002/0038308 A1 * | 3/2002 | Cappi | 707/104.1 |
| 2002/0091696 A1 * | 7/2002 | Craft et al. | 707/10 |
| 2002/0095408 A1 * | 7/2002 | Cheng | 707/3 |
| 2002/0144248 A1 * | 10/2002 | Forbes et al. | 717/167 |
| 2003/0154194 A1 | 8/2003 | Jonas | |
| 2005/0114291 A1 * | 5/2005 | Becker-Szendy et al. | 707/1 |
| 2006/0010119 A1 | 1/2006 | Jonas | |
| 2006/0195486 A1 * | 8/2006 | Ohno et al. | 707/200 |
| 2007/0038664 A1 | 2/2007 | Jonas | |
| 2007/0110044 A1 * | 5/2007 | Barnes et al. | 370/360 |
| 2007/0203933 A1 * | 8/2007 | Iversen et al. | 707/102 |
| 2008/0015919 A1 * | 1/2008 | Busse et al. | 705/8 |
| 2008/0294611 A1 * | 11/2008 | Anglin et al. | 707/3 |
| 2008/0307255 A1 * | 12/2008 | Chen et al. | 714/13 |
| 2009/0106323 A1 * | 4/2009 | Wong et al. | 707/201 |
| 2010/0251237 A1 * | 9/2010 | Coyle et al. | 718/1 |
| 2010/0280990 A1 * | 11/2010 | Castellanos et al. | 707/602 |

OTHER PUBLICATIONS

"XML Attributes," by w3schools.com (Wayback Machine version from Mar. 17, 2009). Available at: http://www.w3schools.com/xml/xml_attributes.asp Wayback machine capture: http://web.archive.org/web/20090317045419/http://www.w3schools.com/xml/xml_attributes.asp.*

* cited by examiner

*Primary Examiner* — Daniel Kinsaul
(74) *Attorney, Agent, or Firm* — Scott P. Zimmerman, PLLC

(57) ABSTRACT

In accordance with one embodiment of the disclosed technology, inconsistencies are detected between various records relating to data that has been associated with an identification tag. Data packages associated with the inconsistencies may then be removed. In accordance with another aspect of the disclosed technology, requests relating to data packages associated with inconsistencies in the various stored records are identified and removed. The disclosed technology may be implemented in data warehouses.

7 Claims, 4 Drawing Sheets

FIG. 2

Table 1, Record 1
RSICCONT - Monitor: Saving of the updated IC and ODSODS per request

| Request | REQU_4EXEFNWT16BZ6U8KNUA11I92W |
|---|---|
| DataStore | ZINV_O16 |
| TimeStamp | 20,090,823,233,656 |
| SID (System ID) | 669,234 |

Table 2, Record 1
RSMONICDP - Monitor Request Data Packet Table

| Request | REQU_4EXEFNWT16BZ6U8KNUA11I92W |
|---|---|
| DataStore | ZINV_O16 |
| TimeStamp | 20,090,823,233,656 |
| Status | 70 (Process Finished) |

Table 3, Record 1
RSODSACTREQ - Activation table of requests

| DataStore | ZINV_O16 |
|---|---|
| Request | REQU_4EXEFNWT16BZ6U8KNUA11I92W |
| Activation ID | ODSR_4EXFN2FQY85D5KKRBBUBEW6L5 |
| TimeStamp | 20,090,823,233,810 |

FIG. 3

Table 1, Record 1
RSICCONT - Monitor: Saving of the updated IC and ODSODS per request

| Request | REQU_4EXEFNWT16BZ6U8KNUA11I92W |
|---|---|
| DataStore | ZINV_O16 |
| TimeStamp | 20,090,823,233,656 |
| SID (System ID) | 669,234 |

Table 2, Record 1
RSMONICDP - Monitor Request Data Packet Table

| Request | REQU_4EXEFNWT16BZ6U8KNUA11I92W |
|---|---|
| DataStore | ZINV_O16 |
| TimeStamp | 20,090,823,233,656 |
| Status | 70 (Process Finished) |

Table 3, Record 1
RSODSACTREQ - Activation table of requests

| DataStore | ZINV_O16 |
|---|---|
| Request | Data Missing |
| Activation ID | Data Missing |
| TimeStamp | Data Missing |

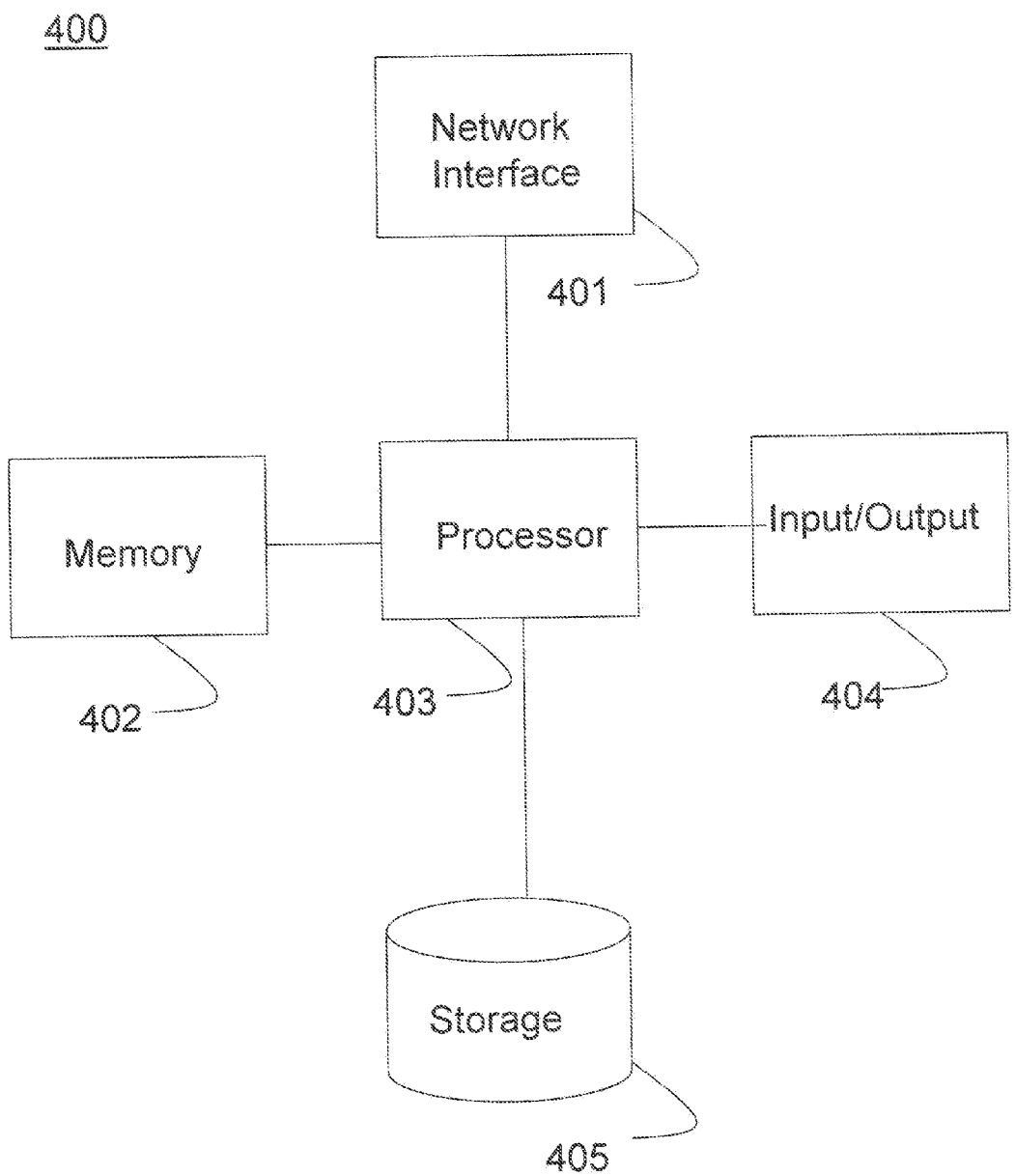

REMOVAL OF INVISIBLE DATA PACKAGES IN DATA WAREHOUSES

FIELD

The disclosed technology relates to data warehouses, and, more specifically to the identification and/or removal of invisible data packages such as those that occur in a data warehouse.

BACKGROUND

"Data Warehouses" are based on relational databases, and may include data management tools to extract data from various sources and manage that data. The data is transferred to the data warehouse in data packages that may include both data and metadata. Information related to the various data packages may be maintained in the data warehouse. All of the data and associated information is not necessarily held in the same database table. Rather, through the use of key fields, the data and associated information may be held in various tables that are linked together in an associated, relational database. The data warehouse operates in conjunction with, or "rides" on, the database.

Problems can arise when the links, that relate various data package information to each other, are broken. This can happen in a number of scenarios, some of which may not be avoidable, such as, for example, if a server shuts down at a particularly inappropriate moment. Often the reason for the link failure will not be known.

A link failure does not necessarily cause an immediate problem with operation of the data warehouse. However, if an operation on, or with, a data package ("a data request") is attempted after a link failure, the data request will likely fail. One such data request involves an attempt to delete a data package. Since the links are broken, the system, in some operations, does not "see" the data package. This will cause the system to overlook the data package and not delete it from, for example, an entity that holds the data for reporting ("a data provider").

Problems associated with such "invisible" data packages, which can not be "seen" by the data warehouse system because of link failures, are call "zombie" problems. One such zombie problem relates to requests involving such data. Such requests are called zombie requests. Zombie requests can cause major problems for the data provider because the request gets "locked" within the data warehouse or the data provider, is never fulfilled, and can not be deleted. However, most significantly, further data can not be loaded until the request is removed. Therefore this problem needs to be resolved with dispatch.

One way of addressing the problem of zombie requests is to have the database administrators remove all of the data and then reload the data. Another way of addressing the problem is to manually identify the data associated with the link failure. These techniques are labor intensive, time consuming, costly, and don't always succeed.

SUMMARY

In accordance with one embodiment of the disclosed technology, inconsistencies are detected between various records relating to data that has been associated with an identification tag. Data packages associated with the inconsistencies may then be removed.

In accordance with another aspect of the disclosed technology, requests relating to data packages associated with inconsistencies in the various stored records are identified and removed.

In accordance with an alternative embodiment of the disclosed technology, a plurality of instructions is stored on a computer-readable medium. The instructions, when executed by a computer, causes the computer to detect inconsistencies between various records relating to data that have been associated with an identification tag, and to remove data packages associated with the inconsistencies. In accordance with further aspects of the disclosed technology, requests involving data packages associated with the inconsistencies may then be removed.

BRIEF DESCRIPTION OF THE DRAWING

FIG. 2 is a schematic representation of proper records in various tables associated with a data warehouse.

FIG. 3 is a schematic representation of various tables associated with a data warehouse, in one of which there are improper records.

FIG. 4 is a schematic representation of a machine that can be used to implement the methodology of the disclosed technology.

DETAILED DESCRIPTION

Figure 1:
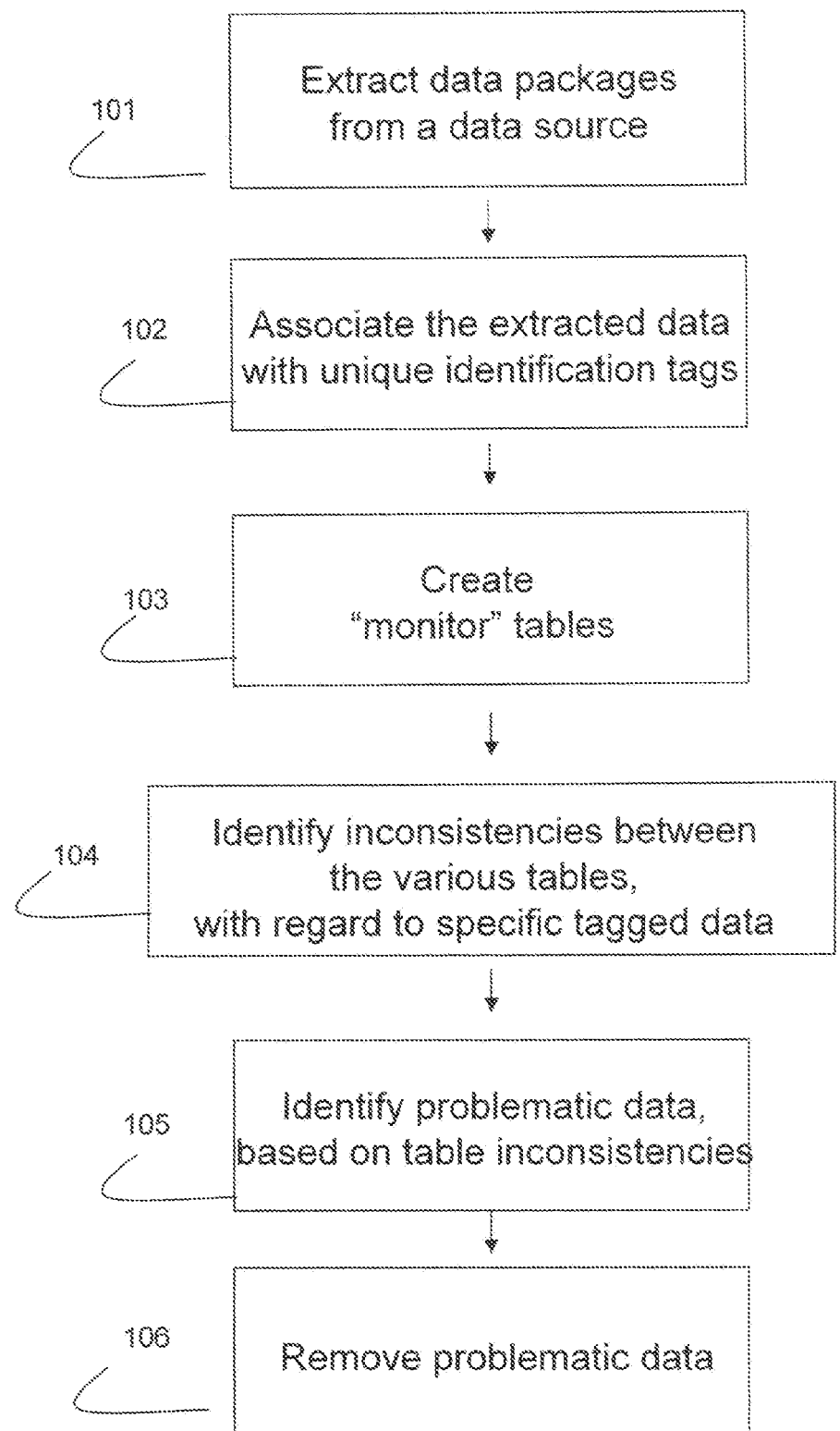
FIG. 1 is a representation of an algorithm embodying one aspect of the disclosed technology.

In one aspect of the disclosed technology zombie requests are managed using the disclosed methodology, as embodied in an appropriate algorithm. In specific embodiments, the disclosed technology can serve at least one, or both, of two functions: 1) identification of problematic data before a zombie problem is encountered; and 2) removal of zombie requests. The ability to identify problematic data before they affect operation of a data warehouse reduces the time it takes to resolve problems associated with the problematic data packages. The ability to remove problematic data packages in accordance with the disclosed methodology, especially when implemented using an algorithm, leads to rapid repair of a malfunctioning data warehouse and reduces the likelihood of introducing additional data problems that occur when the data is repaired manually, due, for example, to inaccuracies attendant to any manual operation.

FIG. 1 is a schematic representation of an algorithm that includes an aspect of the disclosed technology. In FIG. 1, at 101, data packages that are, or may be, associated with a data warehouse, are extracted from a data source. At 102, the extracted data is identified with unique identification tags. At 103, various "monitor" tables are created as part of a database. These monitor tables, which comprise various records, can track the various states or aspects of a data package/request and can have keys that relate records in the tables to each together. At 104, inconsistencies, between various records in the tables that are associated with specific tagged data, are identified. This enables identification, at 105, of problematic data, for example, data that appears in some tables but is missing from others. At 106 the problematic data is removed, for example, from the data warehouse. The disclosed technology enables the identification and extraction of problematic data even before a request involving such data becomes invisible because of the problematic data, as described above. If desired, new data can be reloaded into the data warehouse to replace the problematic data that has been removed. Additionally, data requests associated with the problematic data, such as zombie requests, can be identified and removed.

FIG. 2 is a schematic representation of proper records in various tables associated with a data warehouse. In the FIG. records from three different tables are displayed. In the example shown in FIG. 2, each record has information related to a time stamp, to the location where the data is stored ("datastore"), and to a specific request, as well as a fourth piece of information related to a specific purpose of the particular table, e.g., status, as shown in the fourth row of Table 2.

In FIG. 2, each of the records relates to the same piece of data, as shown by the "datastore" row. This indicates that the data to which each record refers is stored in the same location, i.e., each record refers to the same data. In FIG. 2, there are no apparent inconsistencies between the records in the displayed tables.

FIG. 3 is a schematic representation of various tables associated with a data warehouse in one of which there are improper records. As in FIG. 2, each record in this FIG. refers to the same data package. As will be apparent, fields in the Table 3 record are absent. As a result, linking between the tables is broken, the full status of the data can not be determined, and, as discussed, data, and data requests, associated with this data, will become invisible, i.e., they are zombie data packages and zombie data requests.

Implementation of the disclosed methodology may follow the extract, transform, and load process ("ETL"). In the extract step, the data is obtained from the source. This could be a system, flat file, web service, etc. In the transfer step, the records are brought into the data warehouse and any operations on the data required for reporting are performed. In the load step, records that are needed for reporting are stored in the data warehouse.

The extraction process uses data packages that may include metadata, related to the data source, the data selection process, and processes in which the data will be loaded. In accordance with the disclosed technology, the packages are created with unique IDs ("tagged" with "tags") that allow the system to track and record the progress and/or status of the data extraction. This gives the ability to view specific packages that may have been acted on and loaded to particular data providers. It also enables the ability to determine if there were errors in the data or data handling, whether the data is available for reporting, etc.

In the disclosed technology there are multiple "monitor" tables that track the various states of a data package/request and that have keys that relate the tables to each together. The relationship between the various monitor tables enables construction of a complete picture of the extraction process for a particular request and data provider. These tables are updated at particular times during the process.

There are instances when records within these tables are not consistent. Such inconsistencies can occur, for example, when there is an unexpected system shut down. When this happens, one monitor table may have complete information on a specific data package while another does not. In such case, the system only partially recognizes a request associated with the data package because only some monitor tables have complete information on the data package, and therefore a full picture relating to the data package cannot be made. This scenario—inconsistencies between records in various monitor tables—causes "zombie" packages to occur. Requests involving such "zombie" packages can lock a data provider because the system may not be able to delete the request due to the fact that it does not see the request in all the monitor tables. In the disclosed technology, inconsistencies in the monitor tables allow identification of the zombie packages. Removal of the zombie packages prevents zombie requests. Additionally, identification of the zombie packages allows identification of zombie requests that have already been made. Removal of the requests then allows normal operations to continue.

In one embodiment, the methodology used to remove known, zombie requests includes a user input screen that allows the user to enter a request number and data provider. Typically the request represents the "zombie" request. The reason for allowing request numbers and data providers to be entered is that the administrator may only want to delete a request from a particular data provider, rather than from all providers that contain the request number(s) entered.

The algorithm may allow specific entries to be made, but may not allow value ranges since using value ranges can lead to deleting requests that were not intended to be deleted. The program will then force the user to enter at least one request number so as to delete only the specific request, rather than all of the requests from a specific provider. After the user makes the needed entries, the algorithm is implemented. The algorithm may be implemented by executing an appropriate computer program. The algorithm may check the user entries for validity and may return an appropriate message if the values are found to be invalid. If the entered request number(s) and data provider combinations are found, the program will delete the requests from relevant database tables. Once the process is finished, details of the processing may be output via a new screen. After program is complete, data correction and/or processing may continue.

As mentioned above, the methodology can include searching for an unknown "zombie" request. As is apparent from FIG. 3, once a zombie data package is identified zombie requests associated with that data package can be determined from records in other tables. For example, the data request associated with the data package whose related information is missing from Table 3, can be obtained from Tables 1 or 2.

Specific embodiments of the disclosed technology can be implemented as an application layer tool in data warehouses such as the SAP Business Warehouse, riding on top of an Oracle database. The disclosed technology can also be implemented in other appropriate data warehouses riding on top of any appropriate database. It can also be implemented in appropriate relational databases.

FIG. 4 depicts an exemplary diagrammatic representation of a machine in the form of a computer system 400 within which is a set of instructions, such as those relating to the steps of FIG. 1. When the instructions are executed, the machine performs any one or more of the methodologies and/or technologies discussed in this specification. The instruction may be stored on a computer readable medium, such as, without limitation, a CD or DVD disk, a hard drive, or any other medium which can permanently or temporarily store computer instructions, and from which a computer may obtain the instructions. In some embodiments of the disclosed technology, the machine operates as a standalone device. In other embodiments of the disclosed technology, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. While a single machine is illustrated, the term "machine" shall also be taken to include any collection of machines that individually or jointly execute a set (or multiple sets) of instructions to perform any one or more of the methodologies discussed herein.

In FIG. 4, a processor, 403, (e.g., a central processing unit (CPU), a graphics processing unit (GPU), or both) controls the overall operation of the computer by executing computer program instructions which define such operation. The computer program instructions may be stored in a storage device 405 (e.g., magnetic disk, database) and loaded into memory 402, which may include a main memory and a static memory. The storage and memory may communicate with each other when execution of the computer program instructions is desired. Thus, the computer operation will be defined by computer program instructions stored in memory 402 and/or storage 405, and the computer will be controlled by processor 403 executing the computer program instructions. The memory may include a disk drive unit that may include a machine-readable medium on which is stored one or more sets of instructions (e.g., software) embodying any one or more of the methodologies or functions described herein. The instructions may also reside, completely or at least partially, within the main memory, the static memory, and/or within the processor during execution thereof by the computer system 400. The main memory 402 and the processor 402 also may constitute machine-readable media.

Computer 400 also includes one or more output network interfaces 401 for communicating with other devices and input/output, 404, representing devices which allow for user interaction with the computer 400 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes only. It should also be understood by one skilled in the art that the method of the current disclosed technology may be implemented on a device such as is shown in FIG. 4 by, for example, utilizing appropriate computer instructions as described herein.

Dedicated hardware implementations including, but not limited to, application specific integrated circuits, programmable logic arrays and other hardware devices can likewise be constructed to implement the methods described herein. Applications that may include the apparatus and systems of various embodiments of the disclosed technology broadly include a variety of electronic and computer systems. Some embodiments of the disclosed technology implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the disclosed technology of the present disclosure, the methods described may be implemented as software programs running on a computer processor. Furthermore, software implementations can include, but are not limited to, distributed processing or component/object distributed processing, parallel processing, or virtual machine processing to implement the methods described herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiment of the disclosed technology shown and described herein are only illustrative of the principles of the claimed invention and that various modifications may be implemented by those skilled in the art without departing from the scope and spirit of the invention. Those skilled in the art could implement various other feature combinations without departing from the scope and spirit of the invention. Accordingly, it should be understood that the claimed invention may be broader than any given embodiment described in this specification, or than all of the embodiments when viewed together. Rather these embodiments are meant to describe aspects of the disclosed technology, not necessarily the specific scope of any given claim.

The invention claimed is:

1. A method, comprising:
    receiving a request to load a data package into memory of a data warehouse, the data package comprising both data and metadata;
    extracting the data package from a source;
    tagging the request, the data, and the metadata with a request number;
    generating multiple monitor tables in the memory, each one of the multiple monitor tables associating a different processing status of the data package to the request number;
    storing the data separate from the metadata;
    updating a corresponding one of the multiple monitor tables with a corresponding processing status of the data package;
    comparing entries in the multiple monitor tables;
    detecting, subsequent to completing loading the data package in the data warehouse, an inconsistency between the entries in the multiple monitor tables;
    receiving a removal request in response to the inconsistency;
    deleting the request tagged with the request number; and
    deleting the data package tagged with the request number.

2. The method of claim 1, further comprising deleting the data package.

3. The method of claim 1, further comprising associating a provider of the data package to the request and to the request number.

4. A non-transitory memory storing instructions which when executed cause a processor to perform operations, the operations comprising:
    receiving a request to load a data package into a data warehouse, the data package comprising both data and metadata;
    extracting the data package from a source;
    tagging the request, the data, and the metadata with a request number;
    generating multiple monitor tables in the memory, the multiple monitor tables associating different statuses of the data package to the request number;
    storing the data separate from the metadata;
    updating a corresponding one of the multiple monitor tables with a corresponding status of the data package;
    comparing entries in the multiple monitor tables;
    detecting, subsequent to completing loading the data package in the data warehouse, an inconsistency between the entries in the multiple monitor tables;
    receiving a removal request in response to the inconsistency;
    deleting the request tagged with the request number; and
    deleting the data package tagged with the request number.

5. The non-transitory memory of claim 4, wherein the operations further comprise deleting the data package.

6. The non-transitory computer readable memory of claim 4, wherein the operations further comprise associating a provider of the data package to the request and to the request number.

7. A system, comprising:
a processor; and
a memory storing instructions that when executed cause the processor to perform operations, the operations comprising:
receiving a request to load a data package into a data warehouse, the data package comprising both data and metadata;
extracting the data package from a source;
tagging the request, the data, and the metadata with a request number;
generating multiple monitor tables in the memory, the multiple monitor tables associating different statuses of the data package to the request number;
storing the data separate from the metadata;
updating a corresponding one of the multiple monitor tables with a corresponding status of the data package;
comparing entries in the multiple monitor tables;
detecting, subsequent to completing loading the data package in the data warehouse, an inconsistency between the entries in the multiple monitor tables;
receiving a removal request in response to the inconsistency;
deleting the request tagged with the request number; and
deleting the data package tagged with the request number.

* * * * *